ERIK GUSTAV SUNDBERG
BROR GUNNAR OUSBÄCK
INVENTORS

United States Patent Office 2,747,008
Patented May 22, 1956

2,747,008

METHOD AND MEANS FOR DRYING ACCUMULATOR ELECTRODES

Erik Gustav Sundberg, Osbacken, Nol, and Bror Gunnar Ousbäck, Goteborg, Sweden, assignors to Aktiebolaget Tudor, Stockholm, Sweden, a Swedish joint-stock company Application January 5, 1954, Serial No. 402,333

Claims priority, application Sweden May 21, 1952

12 Claims. (Cl. 136—33)

The present application is a continuation-in-part of our formerly copending application, Serial No. 354,824 filed May 13, 1953, for Method and Means for Drying Battery Electrodes, which application is now abandoned.

In the manufacture of lead accumulators each separate plate, the negative as well as the positive, must be subjected to an electrolytic forming treatment in order to attain the electrochemical characteristics necessary for the accumulator. For certain types of batteries the last stage of the forming involves charging and treating of the plates so that after the final treatment the discharge capacity of the plates amounts to the value which may be obtained in a battery in normal operation when in fully charged condition. A battery made of plates charged in this manner and suitably dried can be stored during a practically unlimited time with its charge preserved so that even after a long time in storage the battery can be made ready for immediate use merely by filling it with electrolyte. However, it is a prerequisite that the plates shall not be permitted to be attacked by air, acids, moisture etc. while in storage. Therefore, the plates must either be stored with the container effectively hermetically sealed or the plates must be given a final treatment in such that sufficiently effective protection against destruction is obtained.

An especially important step in the manufacture of charged plates is the drying of the plates after the electroforming and the usual washing in connection therewith.

In general, the invention utilizes method steps which cause displacement of the water from the formed porous electrode and from the separators if complete storage battery electrode assemblies are involved. The displacement of the water is produced by means of a treatment liquid. The treatment liquid is thereafter evaporated from the electrode and preferably, the treatment liquid is such character that a thin protective coating remains on the electrode. This protective coating prevents deterioration of the electrodes while the fully charged new battery is not used and avoids the necessity for hermetically sealing the battery case prior to filling it with electrolyte at the time when it is originally placed in service.

The invention further comprises apparatus adapted to perform these method steps with a maximum economy of treatment liquid and heat.

The main principle for drying accumulator electrodes according to the invention is broadly characterized by the fact, that the water retained by the electrodes to be dried is replaced by a treatment liquid other than water and that the treatment liquid is subsequently caused to evaporate. Since the treatment liquid requires a much smaller amount of heat its evaporation than the water, the drying process is materially facilitated by this replacement. The invention is also useful where it is desired to dry and treat assembled electrode groups comprising positive and negative electrodes as well as separators. The separators may then be dried at the same time as the electrodes of the groups through a replacement of the water by the treatment liquid and subsequent evaporation of the latter.

The replacement of the water can be carried out in different ways depending on the particular structure involved, for example, if only negative electrodes, if positive and negative electrodes, or if complete groups consisting of positive and negative electrodes and separators are to be dried. In the examples given below different liquids and different temperatures are used and it can be preferable to use one method or the other depending for instance, upon the material the separators are made of. When only negative electrodes are dried, the treatment can be carried out at a higher temperature than when positive electrodes are also dried at the same time.

The replacement of the water may for example be carried out by bringing the electrode into contact with the treatment liquid, the treatment liquid being brought to or maintained at a temperature sufficiently high to cause the water to evaporate. Preferably, the temperature is so chosen that either the treatment liquid or the water retained in the electrode or both are caused to boil.

This contact with the treatment liquid may conveniently be brought about by placing the electrodes to be dried in a vessel containing or receiving the treatment liquid and by supplying heat to the vessel in order to maintain the required temperature during the drying process.

The treatment liquid thus constitutes a medium for supplying heat to the water retained in the electrode and after having replaced the water the treatment liquid may be very easily driven off. The final drying which removes the treatment liquid from the electrode after it has replaced the water is inherently accelerated by the heat stored in the electrode. This final drying may be further accelerated by the use of reduced pressure or by the forced circulation of a gas such as air or nitrogen around the electrode.

In order that a sufficiently complete substitution of the treatment liquid for the water shall be readily achieved and furthermore, that the treatment liquid may be readily separated from the water and, recovered for re-use, it is convenient to use a treatment liquid, which is insoluble or only slightly soluble in water.

It is possible to use a treatment liquid which has a lower boiling point than water. As is well known in connection with distillation processes the treatment liquid will carry away a certain fraction of water during its evaporation. The maximum temperature will then be limited by the difference between the boiling point of the treatment liquid and the boiling point of the water. This will be the case if, for instance, petrol, gasoline, or heptane is used as the treatment liquid. Since it then is necessary that the treatment liquid shall boil, a comparably large amount of treatment liquid will be evaporated along with the water.

Even though the treatment liquid vapor is recovered by means of a return condenser, the comparatively great turnover of the treatment liquid will cause certain heat losses, but on the other hand, the process may be carried out at a comparably low temperature and the final driving off of the treatment liquid will be facilitated, whereby the said heat losses are more or less compensated for.

For purposes of heat economy it is preferable to use a treatment liquid, the boiling point of which is higher than that of water. The temperature is then chosen so that the water boils away while the boiling point of the treatment liquid is not reached. In practice it is often desirable to use a liquid consisting of a mixture of several components as will be described hereinafter, and in such a case at least the dominating component or components should have boiling points which are higher than that of water. As used hereinafter, the term "boiling point of the treatment liquid" is intended to refer to the boiling point of the dominant component or components in the case of a treatment liquid which consists of a mixture of several components.

In this way a considerably smaller amount of treatment liquid is carried away with the water. If atmospheric pressure is maintained, the temperature is inherently kept substantially at 100° C. as long as any considerable amount of water remains in the electrode, because the boiling point of the water then determines the maximum temperature. When the water has been driven off, the temperature of the treatment liquid starts to rise and the heat supply should preferably be controlled so that the boiling point of the treatment liquid will not be reached. By choosing a treatment liquid the boiling point of which is considerably higher than the boiling point of water and controlling the heat supply so as to raise the temperature after the water has been driven off to a point slightly below the treatment liquid boiling point, and of course also below the softening point of the electrode material, a sufficient amount of heat may be stored in the electrodes so that the treatment liquid evaporates in a very short time upon removal of the electrode from the treatment liquid bath or vice versa.

The final drying may also, with or without a final increase of temperature, be accelerated by reducing the pressure acting on the electrodes, whereby the vaporization of the treatment liquid remaining on the electrodes will be promoted. As will be described hereinafter, kerosene may conveniently be used as treatment liquid, and it is then suitable to control the heat supply to the bath so that the temperature rises to about 150° C. at the end of the process.

In order to obtain a protective layer on the electrodes remaining after the drying process, a liquid may be used embodying one or more non-volatile or at least less volatile components than the kerosene mentioned above as an example. Other treatment liquids of this class are turpentine and petrol or gasoline. It is also possible to admix in the treatment liquid a quantity of a non-volatile substance, or a combination of such substances, especially in the event that the treatment liquid itself has not such physical properties that a remaining protective coating can be obtained. Examples of such treatment liquids are benzene or light hydrocarbons belonging to the aliphatic series such as heptane or octane which are stable compounds with but slight chemical activity towards the material of battery electrodes and separators. The admixed substance or substances should be easily broken down by the electrolyte in which the electrodes are immersed for operation, or the quantity of such substance or substances should be so slight that it does not adversely affect the properties of the electrodes and separators.

As examples of suitable admixed substances paraffin oil, castor oil and yolk (also called suint, an unctuous secretion of the skin of sheep) may be mentioned although many other substances selected for instance in the classes mineral oils, animal fats, vegetable oils, waxes and natural or synthetic resins may be useful. The protective coating may also be effected by admixing in the treatment liquid one or more polymerizable substances, which are caused to polymerize during the heat treatment for the final drying or by means of a special heat treatment. The admixed substance or substances should be soluble in the treatment liquid, but insoluble in water.

In order to diminish the fire hazard it is also possible to use a non-combustible treatment liquid, e. g. belonging to the class of chlorinated hydrocarbons such as carbon tetrachloride, trichlorethylene or perchlorethylene, with or without the admixture of one or more substances for forming a protective coating on the electrodes as hereinbefore described.

The main characteristic of the method described above for effecting replacement of the water by the treatment liquid is that the water is vaporized whereas the treatment liquid remains and is absorbed by the electrodes. There are, however, also other methods for effecting the desired replacement.

Thus, for instance, a treatment liquid may be used having so small a surface tension that it displaces the water mechanically due to the relatively greater adhesion to the electrode material of the treatment liquid. In this case it is not necessary to supply heat for carrying out the process, although an increase of temperature of the treatment liquid may be advantageous as it accelerates the process. Any treatment liquid properly chemically inactive to the material of the electrodes and likewise to the separators if complete electrode groups with separators are treated may be used with or without the admixture of suitable surface tension modifying agent such as an emulsifying agent or wetting agent. For instance, as in the case of treatment liquids which are insoluble or only slightly soluble in water and mentioned as examples above, heating may also be used in this case. The wetting or emulsifying agent, if any, may preferably be soluble in the treatment liquid and insoluble in water. The emulsifying or wetting agent admixed in the treatment liquid should of course also be substantially inactive chemically towards the material of the electrodes and separators and, furthermore, it should preferably not be of a type which forms foam. The tension modifying agent may for instance be a compound of the class comprising naphthenic acids. Also a mixture of several tension modifying agents may be used. There are many emulsifying and wetting agents available in the market and some of them are adapted for use with certain treatment liquids. The exact compositions of such substances are usually kept secret by the manufacturers, and the most suitable surface tension modifying agent for use with a particular treatment liquid must ordinarily be determined experimentally.

Also in the event that the treatment liquid may contain one or more non-volatile or slightly volatile substances or one or more such substances may be admixed with it for forming a protective coating as has already been described in connection with the heating method.

In order to facilitate the final drying, that is the removal of the treatment liquid, it is preferable to use an easily relatively volatile treatment liquid, such as hydrocarbons of the aliphatic series, for example heptane ($C_7H_{16}$), whereby the final drying may be effected without any supply of heat, although it will be understood that an increase of temperature will always expedite the final drying process.

A common feature of the two methods described above for replacing the water retained in the electrodes by a treatment liquid is that the treatment liquid in both cases is preferably insoluble or only slightly soluble in water.

A third method for effecting replacement of the water is the use of a treatment liquid which dissolves the water out of the electrode. The treatment liquid then forms a solution with the water retained in the electrode and the supply of treatment liquid should be sufficient so that the final concentration of water will be very slight and immaterial. It will be understood that the treatment liquid preferably should initially be free from water. Conveniently, the treatment liquid is then circulated in a closed circuit comprising a still or a filter for continuously refining the treatment liquid and freeing it from water. Such a filter may for instance contain quicklime or some other known dehydrating agent which is suitable for use in refining and concentrating hygroscopic liquids. Acetone and alcohol may be mentioned as examples of treatment liquids of this class, which compounds are relatively volatile, whereby the final drying will be quickly and easily completed. The whole process may be carried out at room temperature, but it will be understood that an increase of temperature, particularly during the final drying, will accelerate the process.

Also in this case the treatment liquid may contain one or more non-volatile or slightly volatile substances for forming a residual protective coating on the electrode. The coating substance or substances should be soluble in the treatment liquid but insoluble or only slightly soluble in water and the same additional substances set forth above in connection with the purely thermal method are also suitable for use in this modified method.

The invention will be more fully understood by reference to the accompanying drawing together with the following description.

Referring to the drawing.

Figure 1:
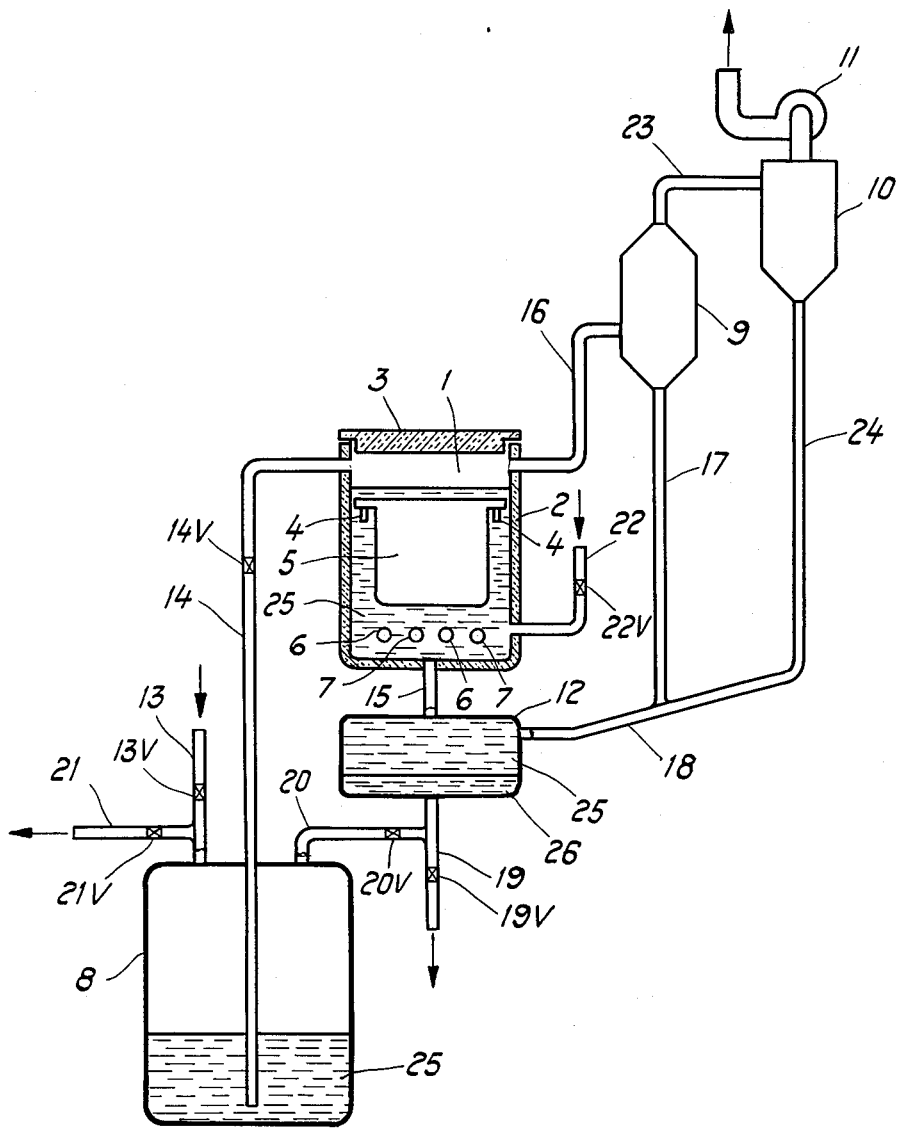
Figure 1 is a diagrammatic elevational view of apparatus for carrying out the method described above by the use of heating means.

Referring to Fig. 1, the reference numeral 1 designates a treatment vessel having heat insulated walls 2 and a top lid 3, likewise heat insulated. In the vessel numeral one (1) there are horizontal supporting bars 4 for supporting the battery plates 5 to be treated, and the lid 3 is hinged or removable, so that the treatment vessel can be opened when being loaded with plates, the lid 3 being closed during operation. Numerals 6 and 7 designate inlets and outlets respectively of heating pipe loops (not otherwise shown) which provided at the bottom of the vessel for heating the treatment liquid by means of superheated steam or the like supplied to the pipe loops from a suitable source. It is also possible to supply the pipe loops with some other heating medium such as hot oil which transfers heat from an electrical or other heat source.

The other main parts of the plant shown are a supply vessel or storage tank 8, a condenser 9, a cyclone separator 10, a suction fan 11, a separation tank 12 and conduits 13—24 controlled by valves 13v—22v respectively.

The operation of the plant will be understood from the following description of an operation cycle for carrying out the process.

At the beginning of the process the treatment vessel 1 is empty. Also separation tank 12 may be assumed to be empty. All the valves shown in Fig. 1 of the drawing may then be presumed to be in closed position. After the battery plates 5 have been placed on the supporting bars 4 and the lid 3 has been closed, valves 13v and 14v are opened. Conduit 13, which debouches into the top portion of supply vessel 8, is connected to a source of compressed air (not shown) and due to the increased pressure on the surface of the treatment liquid 25, which here is presumed to be kerosene, petroleum, or photogene, the treatment liquid is forced upwardly through conduit 14 extending from the bottom of supply vessel 8 into the treatment vessel 1. When the separation tank 12 has been entirely filled through conduit 15 and then treatment vessel 1 has been filled to a predetermined level with kerosene 25 valves 13v and 14v are closed. Heat is now supplied to the heating loops indicated at 6 and 7. When the kerosene bath 25 in vessel 1 reaches a temperature of about 100° C., the water retained in the plates 5 commences boiling. During the boiling the water evaporates through conduit 16 into condenser 9, which is provided with cooling pipe loops or the like in a conventional manner (not shown). The evaporated steam carries with it a certain amount of kerosene which is condensed or collected along with the steam from the plates in condenser 9. Although the boiling point of the kerosene has not been reached, it is in most cases not possible or necessary to prevent some amount of kerosene from being transferred to the condenser 9, and some volatile components of it may evaporate and be condensed in condenser 9 even before the temperature of the treatment liquid has reached the boiling point of the water retained in the plates. The condensed water and the kerosene or kerosene components runs down into the separation tank 12 through conduits 17 and 18. The separation tank 12 should be large enough to hold the amount of water contained in at least one batch of plates in treatment vessel 1.

In the separation tank 12 the condensate running down from condenser 9 will be separated into water and kerosene or kerosene components, since the water, having the greatest specific gravity, sinks to the bottom, while the kerosene with its components floats on the water. The water and the kerosene in tank 12 are designated 26 and 25 respectively. Since the water evaporated from the plates in vessel 1 will in this way be retained within the system, the level of the treatment liquid in vessel 1 will be substantially unchanged during the process.

As long as there remains any considerable amount of water in the plates 5 the heat supplied to vessel 1 will be almost entirely consumed for generating steam, and thus the temperature will not rise appreciably above the boiling point of the water in the plates, that is above about 100° C. in case the treatment is carried out at atmospheric pressure.

At the end of the drying process when the water or the major part of it has boiled away from the plates and has been replaced by kerosene, the temperature begins to rise. When it has reached a value preferably considerably higher than the boiling point of water but preferably below the boiling point of the dominating components of the kerosene, say about 150° C., the heat supply at 6 and 7 to vessel 1 is interrupted. The water 26 collected in separation tank 12 is let out through valve 19v of discharge conduit 19.

When all the water 26 has been removed, valve 19v is closed and valves 20v and 21v are opened, so that the treatment liquid runs back into the supply vessel 8 through conduit 29, while the air above the surface of the kerosene in supply vessel 8 escapes through conduit 21. This process may of course be accelerated by means of a pump or by compressed air supplied to the upper space of vessel 1 and a valve must then be provided in conduit 16 and closed temporarily while vessel 1 is under pressure.

The fan 11 is now put into operation, whereby air is sucked through conduit 22, vessel 1, conduit 16, condenser 9, conduit 23, cyclone separator 10 to suction fan 11. Due to the great amount of heat stored in the plates 5 through the final increase of temperature, the main part of the kerosene retained by the plates 5 rapidly evaporates. The least volatile component or components of the kerosene, however will be retained by the plates, said component or components forming a thin coating effectively protecting the material of the plates against attack from gases as well as from the humidity of the atmosphere.

The kerosene gases evaporated from the plates are condensed substantially in condenser 9 and the condensate runs back into supply vessel 8 via conduits 17 and 18, separation vessel 12 and conduit 20. Some liquid particles may, however, be sucked with the air stream towards suction fan 11. Conduit 23 debouches tangentially into cyclone separator 10 in a manner well known in such separators, whereby the liquid particles are thrown out radially against the wall of the cyclone separator and run down through conduits 24 and 18 to separation tank 12 and via conduit 20 back to supply vessel 8 as described. Also any remaining amount of vapour will be condensed in cyclone separator 10 due to the expansion occuring in the same. The losses of treatment liquid may thus be kept low.

When the final drying is finished, the suction fan 11 is stopped and the plates 5 are removed and placed, for instance, in their ordinary battery casings, in which they can be stored for years without electrolyte and also without any requirement of hermetically sealing the casings.

It will be readily understood that the apparatus of Fig. 1 will operate in substantially the same way regardless of which treatment liquid is used. If the boiling point of the treatment liquid, petrol for instance, is lower than that of water, it will be appreciated that a greater amount of treatment liquid will circulate through the system and that any final temperature rise for the final drying cannot be so easily effected, but in point of principle the plant may be used with advantage for all treatment liquids mentioned or indicated in the foregoing specification.

It has been found to be desirable that the electrodes shall be exposed to the air for as short a time as possible during the interval between the electroforming and the treatment according to the invention. For this reason it may be advantageous to keep the electrodes in a water bath until the treatment begins. Thus for instance it is possible either to initially fill the treatment vessel with water and immerse the electrodes in the water bath or have the electrodes placed in a special water container which is in turn placed in the empty treatment vessel, whereupon the treatment liquid is caused to replace the water at the same time as it fills the treatment vessel.

The reason why conduit 14 for supplying the treatment liquid to treatment vessel 1 debouches at the top of this vessel is to make it possible for the treatment vessel 1 to be initially filled with water through a conduit (not shown), the water being continuously let out through valve 19v as the treatment liquid fills the treatment vessel 1 and separation tank 12 from above, so that the plates 5 are all the time kept below the liquid level. It will be appreciated, that in the case the treatment vessel 1 is not initially filled with water, that conduit 14 may be dispensed with, provided conduit 20 then extends to the bottom of supply vessel 8. Conduit 20 is then used for supplying treatment liquid to separation tank 12 and treatment vessel 1 at the beginning of the process as well as for returning it to the supply vessel at the end of the process.

It will be understood that the plant shown in Fig. 1 may be used without any or only slight modifications for a treatment liquid having a surface tension modifying agent admixed therein for replacing the water retained in the plates. The heating pipe loops or corresponding heating means may then be dispensed with although they also may be retained and used for accelerating the process by a moderate increase of temperature.

As has already been mentioned it is also possible to combine different methods for replacing the water retained in the plates or plates and separators respectively by the treatment liquid. Such a combination may be justified, for instance, in the case one method is particularly simple and economical with regard to separators, heat consumption, refinement of the treatment liquid etc. but does not quite satisfactorily free the plates and separators from water in a moderate time of treatment, while another method is capable of removing the water more completely but on the other hand is not suitable for removing all the water. The main part of the water is then conveniently removed by the first-mentioned method, so that only a comparably slight amount of water remains in the plates or separators after this treatment, while the removal of the remainder is effected by the last-mentioned method.

Figure 2:
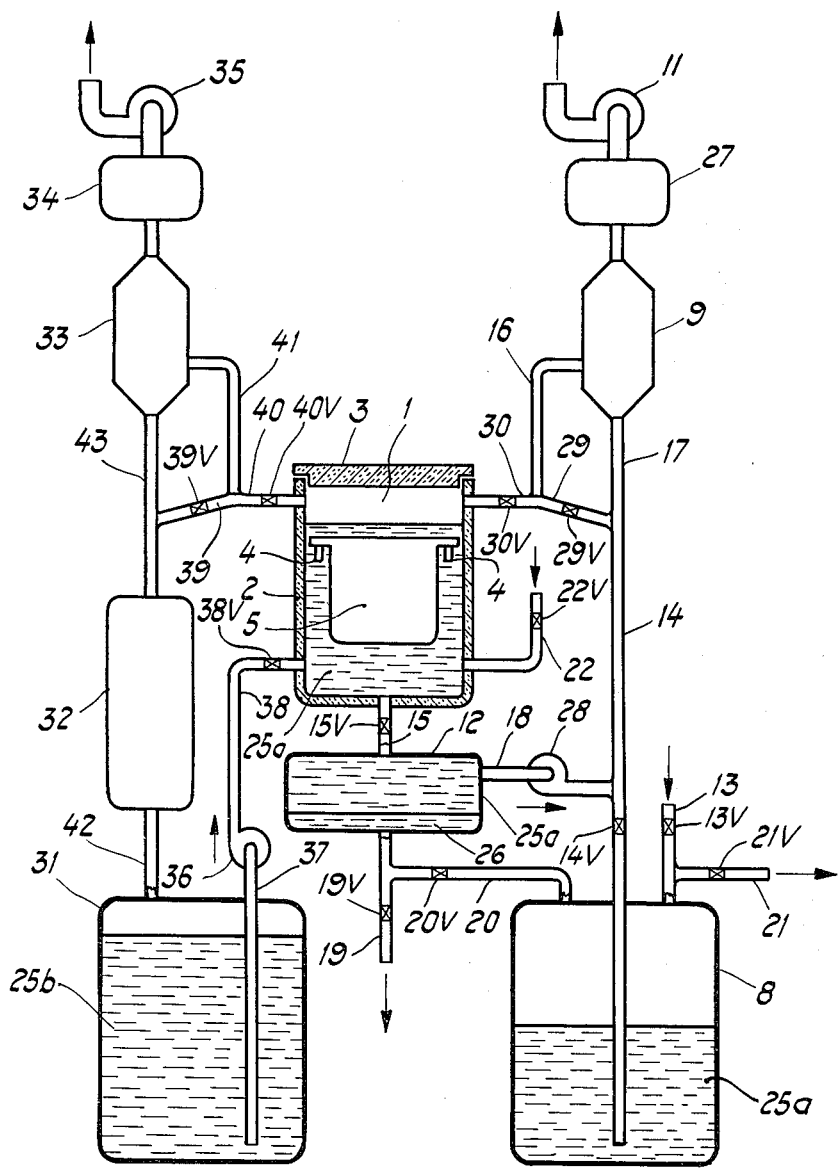
Figure 2 is a view similar to Fig. 1 in which the method is carried out substantially at room temperature.

In Fig. 2 a plant is shown which is adapted for such a combined process comprising a first treatment with a treatment liquid insoluble in water and having a surface tension modifying agent admixed therewith, and a second treatment with a treatment liquid soluble in water and removing the residual water still remaining after the first treatment by dissolving the residual water out of the plates.

All elements in Fig. 2 which are identical or similar to corresponding elements in Fig. 1 have the same reference numerals as in Fig. 1. It will be found that the treatment vessel 1, separation tank 12 and the right-hand part of the plant including supply vessel 8, condenser 9 and suction fan 11 with their associated conduits are arranged similarly to the arrangement shown in Fig. 1. The cyclone separator 10 of the plant shown in Fig. 1, however, has been replaced by a filter 27, containing active carbon, and, furthermore, conduit 18 is connected to conduit 14 through a pump 28, while conduit 14 is directly connected to the outlet conduit 17 of condenser 9 on one hand and to the treatment vessel 1 through conduits 29 and 30 on the other hand.

The left-hand part of the plant comprises store tank 31, a still 32, a condenser 33, a filter with active carbon 34, a suction fan 35, a pump 36, and conduits 37—43 controlled by valves 38v—40v respectively.

The treatment liquid 25a in supply vessel 8 consists for instance of heptane with a naphthenic acid or an admixed surface tension modifying agent.

In this case it may be assumed that the treatment vessel 1 is filled with the treatment liquid 25a before the plates 5 to be dried are immersed therein.

Before the plant is put into operation all the valves are closed and the treatment vessel 1 is empty. The filling of the latter with treatment liquid 25a is effected by opening valves 14v, 29v, 30v, 15v and 13v. Compressed air supplied to conduit 13 presses the treatment liquid 25a upwardly from supply vessel 8 through conduits 14, 29 and 30 into vessel 1 and through conduit 15 also into separation tank 12. When tank 12 has thus been entirely filled and vessel 1 has been filled to a predetermined level, valves 13v and 14v are closed and the plates 5 are immersed in the treatment liquid 25a of treatment vessel 1. Due to the reduced tension action of the treatment liquid 25a the water is continuously forced out of the plates and replaced by treatment liquid. The process is promoted by means of a pump 28 causing the treatment liquid to circulate through a closed path comprising conduits 18, 14, 29 and 30, whereby the treatment liquid is propelled through separation tank 12, where the water 26 sinks to the bottom. In this way the main part of the water retained in the plates 5 is transferred to the separation tank 12. The water 26 is now let out through valve 19v and the treatment liquid is then returned from separation tank 12 and vessel 1 to supply vessel 8 through conduit 20 in the same way as has been described in connection with Fig. 1.

It will be appreciated that the treatment liquid may alternatively be returned to supply vessel 8 by opening valve 14v so that the emptying of the vessel 1 is accelerated by pump 28.

The next step is the removal of the treatment liquid 25a from the plates in the treatment vessel 1. Valve 22v is then opened while preferably all of the other valves, except valve 30v, are closed, and suction fan 11 is started. Air is sucked through conduit 22, vessel 1, conduit 16, condenser 9 and filter 27, whereby the treatment liquid retained in the plates evaporates and follows the air towards suction fan 11. The main part of the evaporated treatment liquid is condensed in condenser 9 and returned to the system through conduits 17 and 14 while any remainder not condensed will be absorbed by the filter 27.

The first drying process may be insufficient to remove all or substantially all the water from the plates and the drying may then be completed by means of treatment liquid 25b of supply vessel 31. Treatment liquid 25b preferably consists of acetone or alcohol or a similar liquid capable of dissolving water. A non-volatile or slightly volatile substance non-insoluble in water is admixed with the treatment liquid 25b for forming a protective layer on the treated plates as has already been described. Valves 38v, 39v and 40v are opened while all the other valves are closed. The pump 36 is started, whereby the treatment liquid 25b is first caused to fill treatment vessel 1 and then to circulate in a path comprising conduit 37, pump 36, conduit 38, treatment vessel 1, conduit 40, conduit 39, still 32, conduit 42 and supply vessel 31. The treatment liquid 25b thus takes up the remaining water from the plates, which is then separated from the treatment liquid in still 32, keeping the treatment liquid returned to the vessel 31 continuously pure or at a high concentration.

When this phase of the process has been continued for a time sufficient to assure a satisfactory removal of the remaining water from the plates, pump 36 is stopped and the treatment liquid 25b is returned to supply vessel 31 through conduit 38 or through a special return conduit (not shown). Valve 22v is now opened, valve 39v is closed and suction fan 35 is started, whereby air is sucked through conduit 22, treatment vessel 1, conduits 40 and 41, condenser 33 and filter 34. The treatment liquid 25b retained in the plates is thus evaporized and follows the air stream towards suction fan 35. The main portion of the evaporated treatment liquid is condensed in condenser 33 and returned to supply vessel 31 through conduit 43 via still 32, in which it is dehydrated. The remainder of the evaporated treatment liquid is absorbed by filter 34.

Although the processes described in connection with Fig. 2 may conveniently be carried out at room temperature, it is obvious that also in this embodiment the treatment vessel 1 may be provided with means for increasing the temperature as desired during any or all of the phases of the process.

The still 32 is shown in block-form only, as it is a well-known conventional device constructed and arranged for separating water from alcohol, acetone etc. through distillation. The still 32 may be replaced by a vessel containing a dehydrating agent, such as quicklime, particularly if a treatment liquid, e. g. alcohol, which is used is incapable of being fully concentrated by distillation. It is also possible to insert such a vessel with a dehydrating agent between the still 32 and the supply vessel 31.

The embodiments of the invention described above are disclosed by way of example only, and it will be understood from the foregoing specification that the invention may be utilized in many different ways within the scope of the appended claims.

The method according to the invention may be used for treating either positive or negative electrodes or for positive as well as negative plates at the same time. It is also possible to treat assembled electrode assemblies comprising separators, and it will be understood that the treatment liquid or liquids as well as additional substances and agents must be chosen with regard to the various conditions. Thus, for instance, the treatment of an electrode assembly comprising rubber separators should be carried out by means of a treatment liquid comprising admixtures, if any, such that the treatment liquid will not appreciably dissolve rubber. In such a case heptane may be used with an admixture of an aliphatic fat for forming the protective coating on the electrodes.

It will also be understood that the method according to the invention may be used for treating other electrodes than those for batteries of the lead-acid-type, for instance sintered electrodes for alkaline cells.

We claim:

1. Drying apparatus for removing water from a charged porous battery electrode, said apparatus comprising in combination: a treatment vessel adapted to contain a treatment liquid which is lighter than water and substantially insoluble therein; supporting means disposed in said vessel and adapted to support said electrode immersed in said treatment liquid; a separation tank disposed beneath said treatment vessel and in communication therewith, said treatment vessel having a capacity at least sufficient to hold all of the water removed from said electrode; a supply vessel of treatment liquid; means for transferring treatment liquid from said supply vessel to said treatment vessel; means for causing evaporation of treatment liquid in said treatment vessel along with water from said electrode; condenser means connected with said treatment vessel for receiving vapor therefrom; duct means for transferring condensate from said condenser to said separation tank; means for removing water from the lower portion of said separation tank and further duct means for returning treatment liquid from said separation tank and from said treatment vessel to said supply vessel.

2. Drying apparatus for removing water from a charged porous battery electrode, said apparatus comprising in combination: a treatment vessel adapted to contain a treatment liquid; supporting means disposed in said vessel and adapted to support said electrode immersed in said treatment liquid; a separation tank disposed beneath said treatment vessel and in communication therewith; a first supply vessel for a first treatment liquid, said first treatment liquid being both volatile and substantially insoluble in water, said first treatment liquid containing a wetting agent and having a specific gravity less than that of water; a second supply vessel for a second treatment liquid, said second treatment liquid being both volatile and water soluble; means for transferring said first treatment liquid from said first supply vessel to said treatment vessel to displace said water from said electrode; means for circulating said first treatment liquid through said treatment vessel and said separation tank in a closed circuit; means connecting said treatment vessel with said first supply vessel for returning said first treatment liquid thereto; a first air circulating means connected with said treatment vessel for circulating air therethrough to evaporate substantially all of said first treatment liquid remaining in and on said electrode; means connected with said first air circulation means for collecting and condensing the vapors of said displaced water and said first treatment liquid and conveying the condensate to said separation tank; means for transferring said second treatment liquid from said second supply vessel to said treatment vessel to dissolve remaining water from said electrode; means connecting said treatment vessel with said second supply vessel for returning said second treatment liquid thereto; and a second air circulating means connected with said treatment vessel for circulating air therethrough to evaporate substantially all of said second treatment liquid together with the water dissolved therein remaining in and on said electrode.

3. Apparatus according to claim 2, further comprising condenser means connected to said treatment vessel and included in said connection of said second air circulation means thereto for condensing water vapor and vapor of said second treatment liquid; and a still connected to receive condensate from said condensing means for separating said second treatment liquid from said water, said still being connected to said second supply vessel to return a distillate comprising said second treatment liquid thereto.

4. The method of drying and protecting a water containing porous electrode, which comprises the steps of: bringing the electrode to be dried into intimate contact with a first treatment liquid which is substantially insoluble in water and which includes a wetting agent, said wetting agent being substantially insoluble in water and soluble in said first treatment liquid for forcing the water out of the electrode, evaporating substantially all of the first treatment liquid retained in the electrode, bringing the electrode into intimate contact with a second, water-soluble treatment liquid, including at least one effectively nonvolatile coating substance substantially insoluble in water admixed therein, said second treatment liquid dissolving out of the electrode substantially all of the water remaining therein, and evaporating substantially all of said second treatment liquid retained in the electrode leaving a protective coating on the electrode formed by said coating substance.

5. The method of drying a charged battery electrode and simultaneously protecting it against attack from the oxygen of the atmosphere, comprising the steps of: immersing the electrode in a treatment liquid having a boiling point higher than that of water and which is substantially insoluble in water, and including a substantially nonvolatile coating substance dissolved therein, supplying heat to said treatment liquid so as to cause the water of the electrode to evaporate, and evaporating said treatment liquid so as to leave a thin protective coating of said coating substance on said electrode.

6. The method according to claim 5, in which a wetting agent soluble in the treatment liquid and substantially insoluble in water is added to the treatment liquid.

7. The method according to claim 5, comprising the further steps of: collecting and condensing the vapor of said treatment liquid during the evaporation thereof, whereby said treatment liquid is recovered for re-use.

8. The method of drying a water containing porous charged battery electrode and simultaneously protecting it against attack from the oxygen of the atmosphere, comprising the steps of: immersing the electrode in a treatment liquid which is substantially insoluble in water, said liquid having a boiling point higher than that of water and including an effectively non-volatile coating substance dissolved therein, which coating substance is substantially insoluble in water, supplying heat to said treatment liquid so as to cause the water in the electrode to boil away; terminating contact between said treatment liquid and said electrode; and causing the portion of the said treatment liquid absorbed by said electrode to evaporate so as to leave a thin protective coating of said coating substance on said electrode.

9. The method according to claim 8, comprising the further steps of: collecting and condensing the vapor of said treatment liquid during the evaporation thereof, whereby said treatment liquid is recovered for re-use.

10. The method of drying a water-containing, charged porous battery electrode while simultaneously protecting the electrode against attack from the oxygen of the atmosphere, comprising the steps of: immersing said electrode in a treatment liquid having a boiling point higher than that of water, a specific gravity less than that of water, and which is substantially insoluble in water; supplying heat to said treatment liquid so as to cause said water in said electrode to evaporate; collecting and condensing all of the vapor of said water along with whatever vapor may be contributed by evaporation of said treatment liquid; returning all of the condensate produced by said collecting and condensing steps into said treatment liquid in which said electrode is immersed at a level spaced below said electrode in a closed circulatory manner; and allowing the water in said condensate to settle; whereby the level of said treatment liquid in which said electrode is immersed remains substantially constant throughout the entire course of said evaporation and said electrode is maintained continuously immersed in said treatment liquid and thereby protected against exposure to the atmosphere.

11. The method of drying a water containing charged porous battery electrode, which comprises the steps of: immersing said electrode in a first volatile treatment liquid which is substantially insoluble in water and which contains a wetting agent for causing said first treatment liquid to displace said water from said electrode; removing said first treatment liquid substantially entirely from said electrode by evaporation; immersing said electrode in a second volatile treatment liquid which is soluble in water for dissolving undisplaced water remaining in said electrode, said second treatment liquid having a substantially non-volatile coating substance dissolved therein; and removing substantially all of said second treatment liquid from said electrode by evaporation leaving a protective layer of said coating substance deposited on said electrode.

12. The method according to claim 11, comprising the further step of collecting and condensing the vapor of said first treatment liquid for re-use; collecting and condensing the vapor of said second treatment liquid along with water vapor; and distilling the condensate obtained by said last-named condensing step to recover said second liquid therefrom for re-use.

References Cited in the file of this patent

UNITED STATES PATENTS

| 1,799,248 | Reinhardt | Apr. 7, 1931 |

FOREIGN PATENTS

| 201,750 | Germany | Aug. 1, 1907 |